Jan. 4, 1949.        R. E. FULTON, JR., ET AL        2,457,884
                       ROADABLE AIRPLANE
                                                  7 Sheets-Sheet 1
Filed March 3, 1945
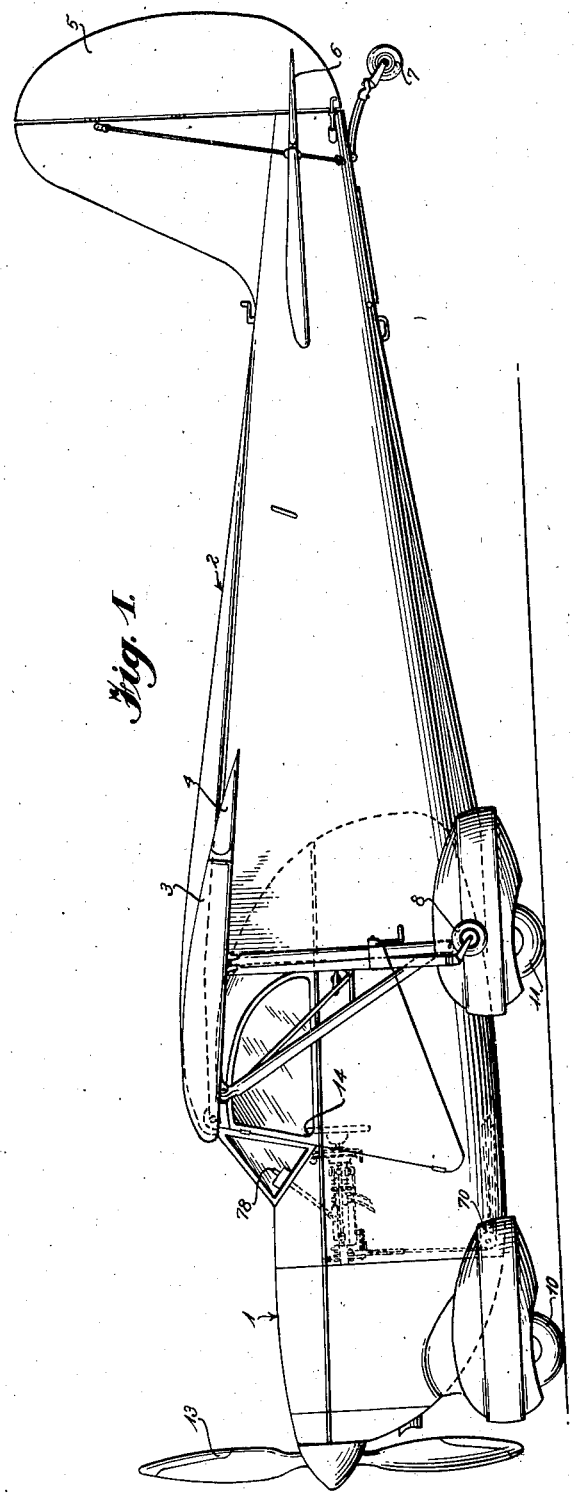
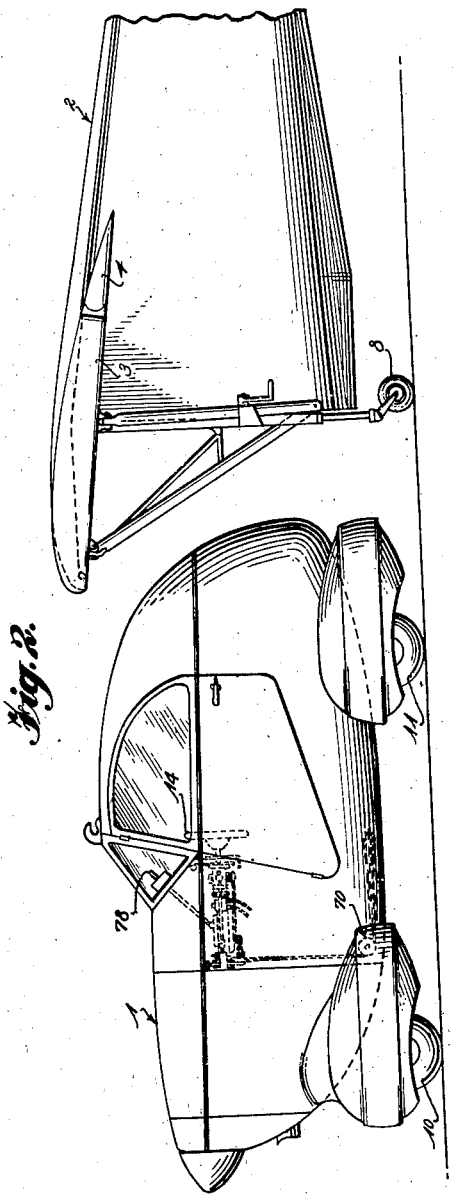
Inventors
Robert E. Fulton, Jr.
and Octavio J. Alvarez
By Stevens and Davis
Attorneys

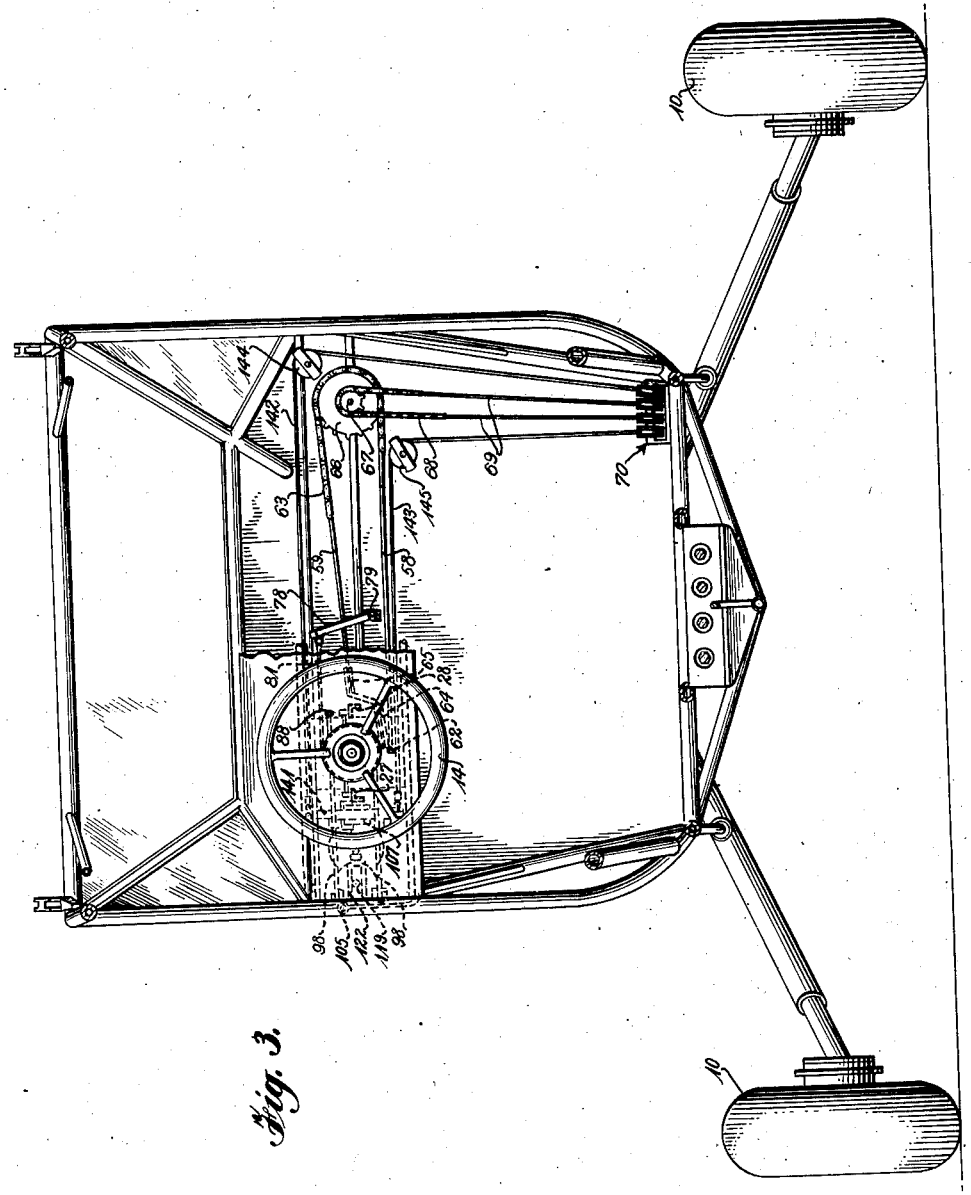

Jan. 4, 1949. R. E. FULTON, JR., ET AL 2,457,884
ROADABLE AIRPLANE
Filed March 3, 1945 7 Sheets-Sheet 3
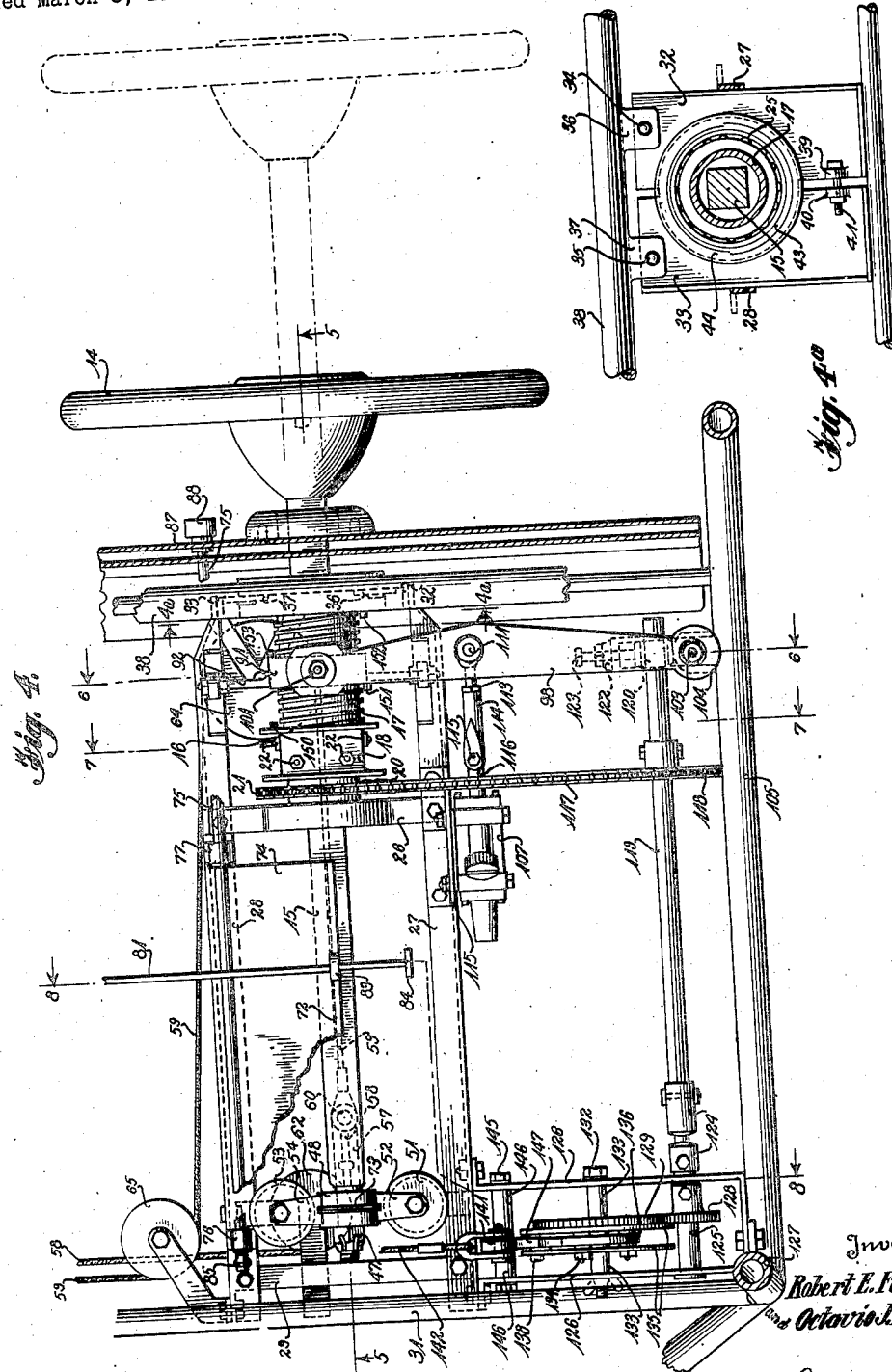

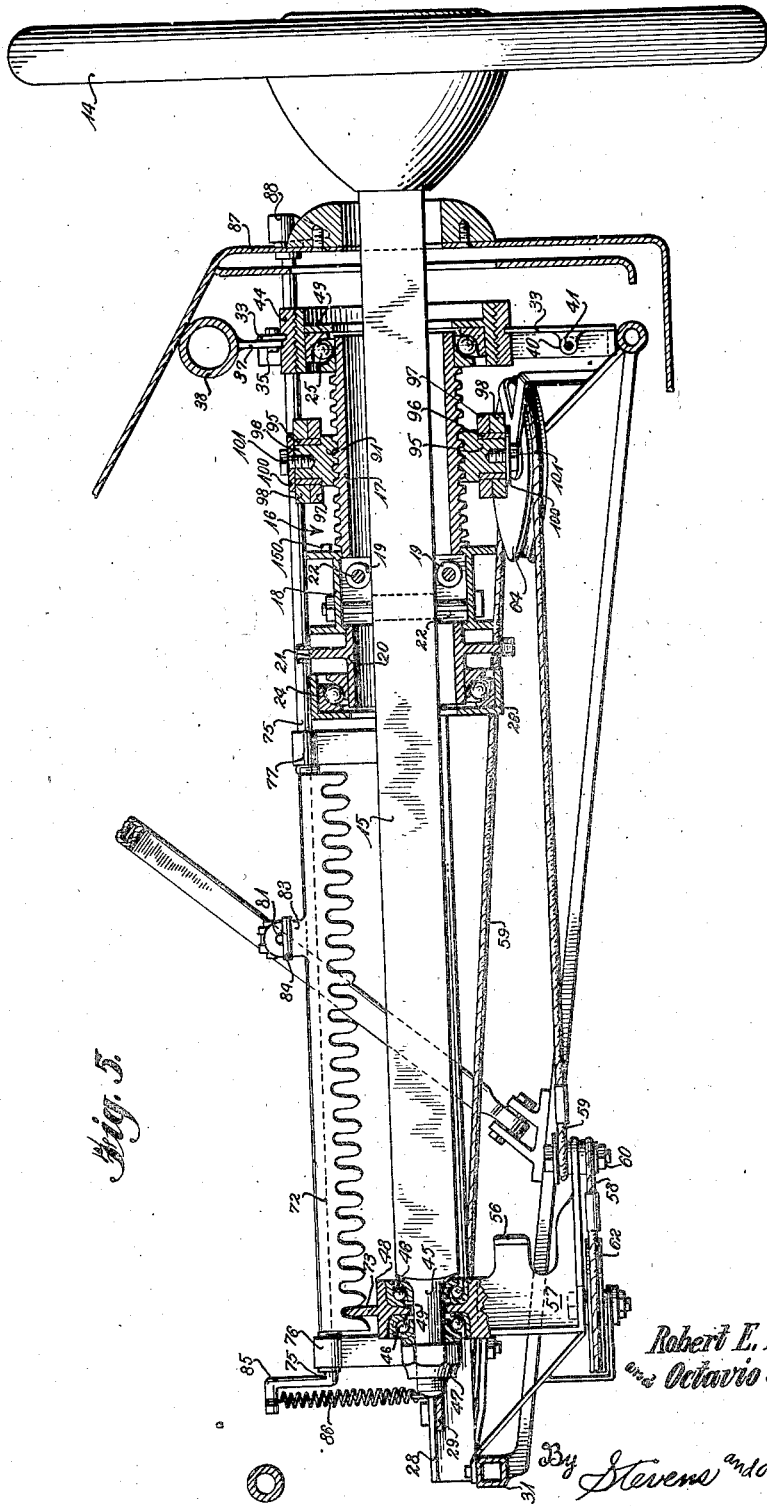

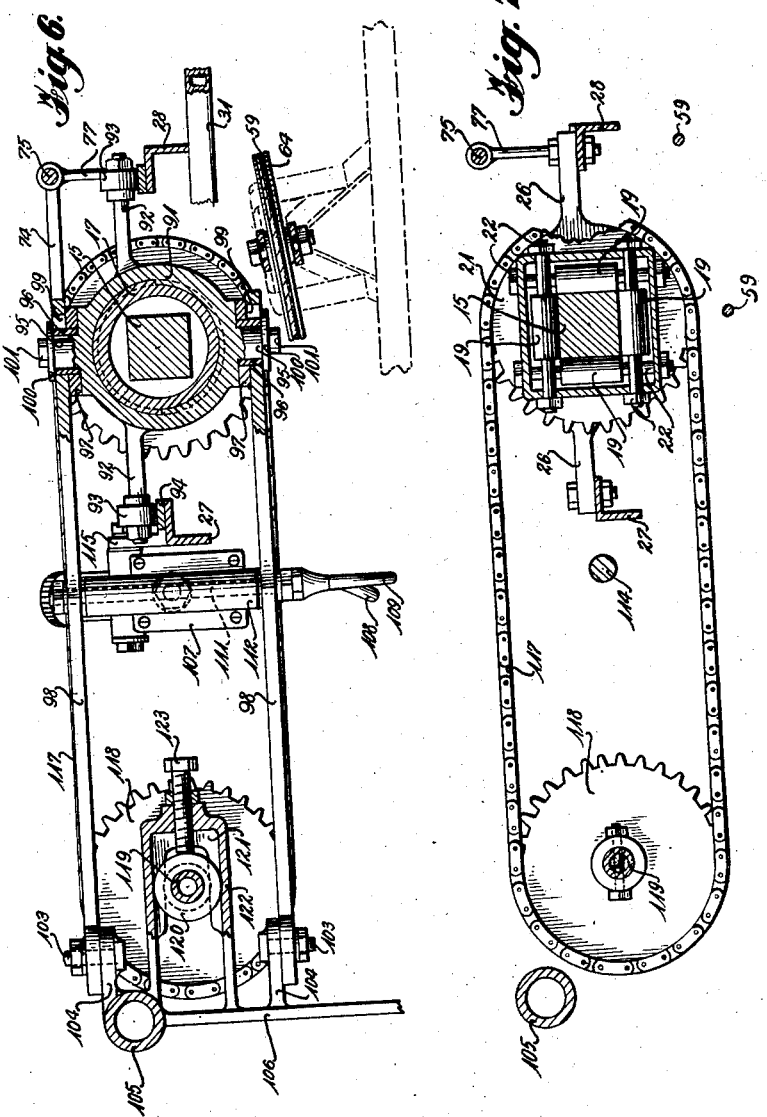

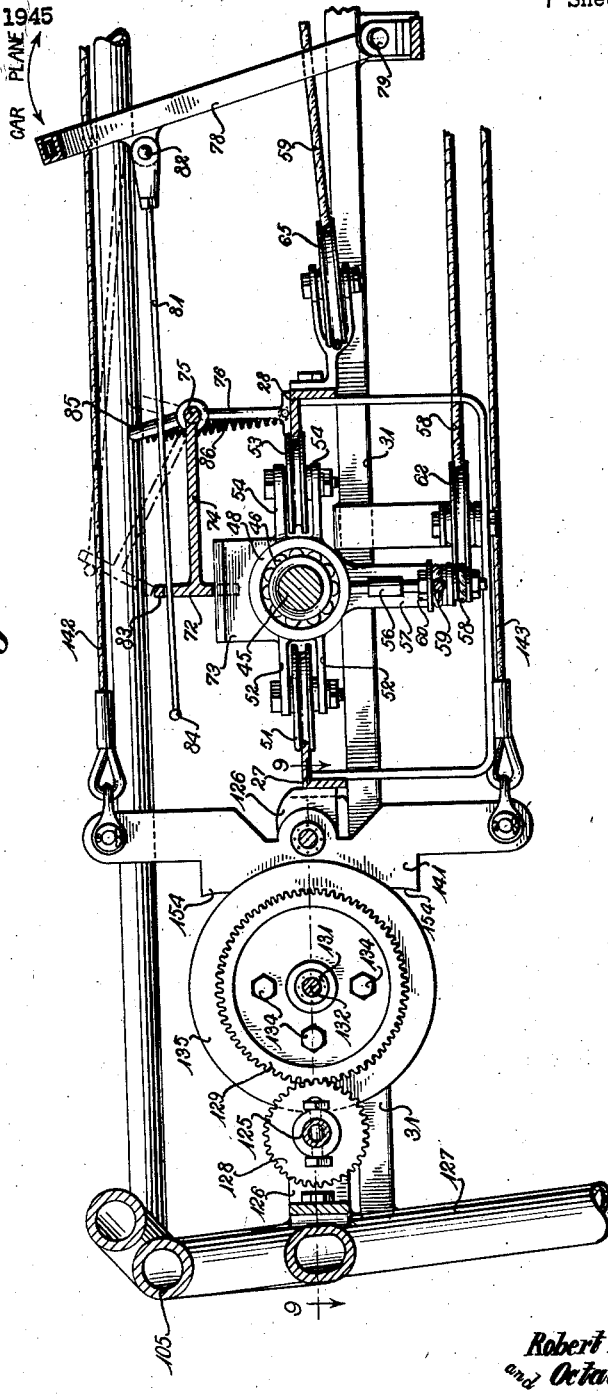

Jan. 4, 1949.  R. E. FULTON, JR., ET AL  2,457,884
ROADABLE AIRPLANE
Filed March 3, 1945  7 Sheets-Sheet 7
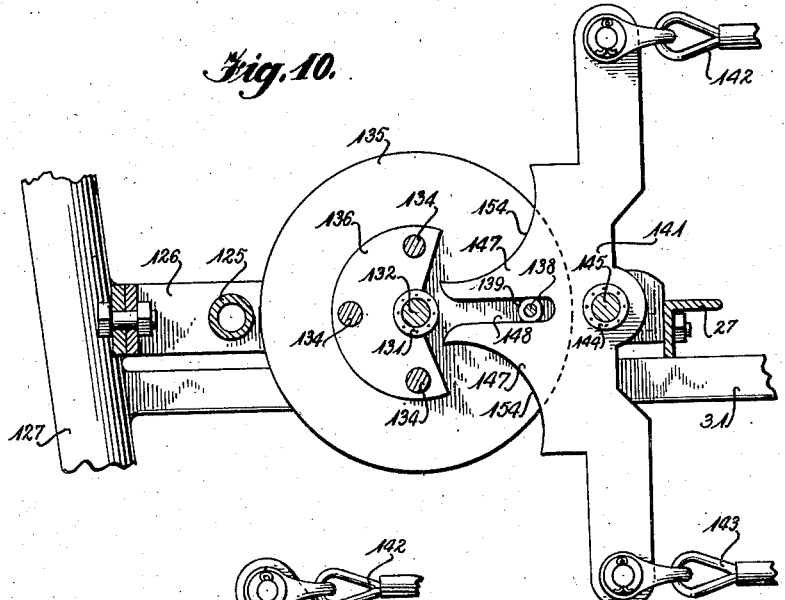
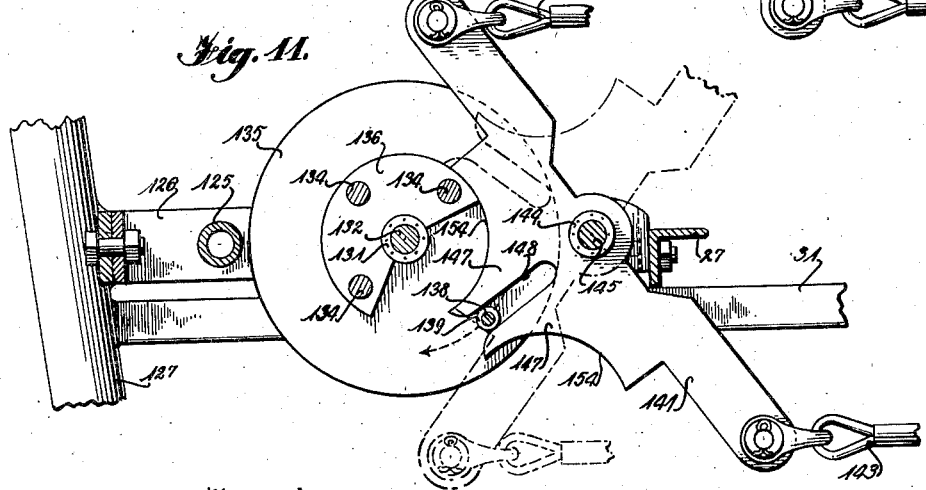
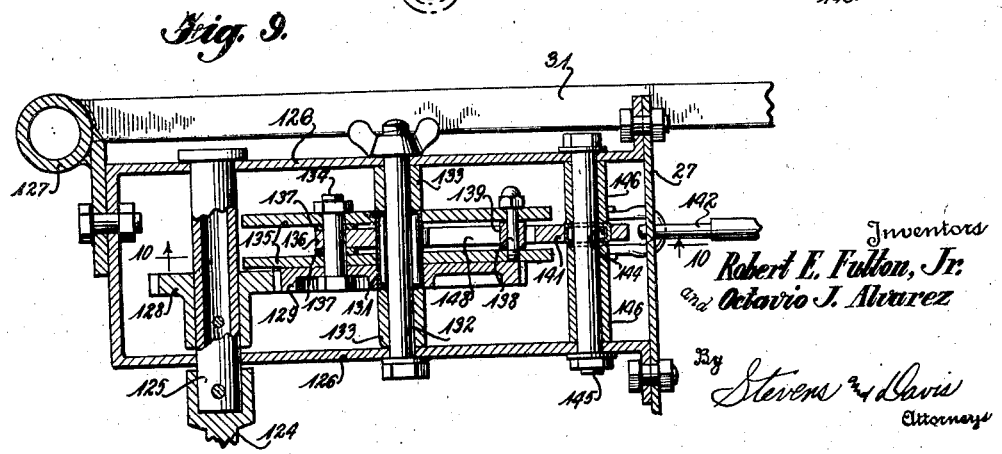

Patented Jan. 4, 1949

2,457,884

UNITED STATES PATENT OFFICE 2,457,884

ROADABLE AIRPLANE

Robert E. Fulton, Jr., Washington, D. C., and Octavio Jose Alvarez, New York, N. Y., assignors to Continental, Incorporated, Washington, D. C., a corporation of Connecticut Application March 3, 1945, Serial No. 580,847

6 Claims. (Cl. 244—2)

This invention relates to a vehicle primarily intended for use as an airplane in which a section containing the power unit and the operator's controls may be separately used as an automobile.

The history of the airplane is almost as old as that of the automobile. Both appeared at approximately the turn of the century. Yet today, almost a half a century later, there are a very large number of automobiles in this country to every one privately owned airplane.

Such a condition is the result of certain basic shortcomings in the airplane. Airplanes require airports to operate. Airports are of necessity located on the outskirts of communities, not infrequently at considerable distance. Thus the time saved by the speed of aerial transportation is more frequently than not consumed by the ground-travel time required to get from the airport to the flier's final destination.

Furthermore, the expense of travel between the airport and the community, usually involving taxis, is not inconsiderable. When to this is added the initial cost and upkeep of the airplane plus that of an automobile which the flier undoubtedly owns as well, it is obvious why few can afford to own an aircraft.

The average automobile ride from point of origin to destination is not over five miles. For every automobile trip of several hundred miles, the average man makes as many as a hundred short local trips. Since he can afford only an automobile or an airplane, his choice is obvious.

This has been the basic factor in retarding widespread public adoption of the airplane in the past and, unless remedied, will have a serious effect on its future. Various endeavors have been made to circumvent the situation. Closer-to-town airports, locally available cars for rent, and other expedients have been offered but they fail to solve the basic practical and economic problems.

While the real cure has been much discussed, little or nothing of a practical nature has been executed to carry it into effect. Obviously there is much in common between an automobile and an airplane. Both have wheels, a body, a cab or cabin, a motor, and controls for starting, guiding and stopping. When a pilot leaves his aircraft at an airport and takes a cab to town he is leaving behind 90% of the basic elements of an automobile—an expensive and unnecessary procedure which has done more than any other thing to stifle aviation.

Others have recognized this fundamental problem and have made efforts to solve it by accomplishing a transition from airplane to car and back. But the problem has many aspects—mechanical, aerodynamic, practical, safety, economy, comfort, service and maintenance, public reaction and acceptance. Of the several suggested solutions which have been offered to date, all have failed due to neglect of one or more of the above features. Most have been so radical in conception and based on such untried principles that they have failed to hold public interest. Others have made contributions which, unless supplemented by many additional features, were of little practical value.

It is an object of this invention to produce a roadable airplane by making a practical combination of already accepted forms and styles of automobile and aircraft designs, thereby making the final unit one of greater public value by a combination of already familiar elements.

The present invention therefore is concerned with an airplane having a removable section adapted for use as a standard automobile and an airplane section comprised of wings, fuselage and flight control surfaces, having cooperating interlocking wings on the airplane and automobile sections by which the sections may be firmly held together to establish a complete airplane. The invention contemplates the provision of means in the automobile section for making use of the same manually operable elements for controlling road travel of the automobile section or air travel of the completed automobile.

When the completed airplane is being used for air travel, it is desirable that it be controllable in the usual manner for airplanes. This is important because the pilot will be able to handle the airplane by the performance of those acts which have become automatic to him, or nearly so, through customary usage. By handling the airplane in a conventional manner, it will be safer in its operation as the pilot will not have to remember to fly it by any different or unusual procedure.

A conventional manner of controlling the flight of an airplane involves the use of a wheel, placed in the position of the steering wheel of an automobile. When this wheel is rotated the ailerons are moved to bank the airplane or keep it laterally stabilized, and when this wheel is urged back and forth in the direction of its axis, the elevators are moved to cause ascent, descent or forward level flight. When the automobile section is used alone for road travel however, this same steering wheel should preferably be usable to direct the front wheels of the automobile to guide it. This use of the same steering wheel for road travel and also for flight, involves a problem however because only about a half turn of the control wheel should be required to fully move the ailerons, whereas on the order of two and a half turns should be required to move the road wheels from one extreme position to the other.

This half turn movement of the steering wheel to move the ailerons from one extreme position to the other is important so that a slight turn of the wheel will have a pronounced effect upon the flight of the airplane. With this relationship the pilot can quickly counteract any tendency of the airplane to divert from the desired flight. However, for road travel, the conditions are somewhat reversed as a large movement of the steering wheels should guide the front wheels only slightly as this enables the driver to more easily maintain the automobile in the desired course. Also, with this large ratio of movement, if the front wheels strike an obstruction, there is little or no tendency to draw the steering wheel out of the driver's grasp and rapidly shift the course of the automobile.

The invention therefore involves the provision of a steering wheel, a part turn of which will move the ailerons through their full movement, but which can be continued to be rotated through several turns to guide the front wheels. This involves the provision of means which will not arrest the turning of the steering wheel after it has reached the limits of its rotation necessary to fully move the ailerons, but which will permit the continued turning of the steering wheel to the extent necessary to fully guide the front wheels.

As a further feature of the invention, the steering wheel is capable of endwise movement during flight to move the elevators, but is locked against endwise movement during road travel. Furthermore, this locking means is manually controllable to permit the endwise adjustment of the steering wheel to a preferred position.

Other features of the invention will be evident from the following description and from the drawings, which disclose a preferred structural embodiment of the invention.

In the drawings:

Figure 1 is a side elevation of the airplane as it appears when the automobile and airplane sections are assembled for flight, certain structural elements of the invention being generally represented by phantom lines;

Figure 2 shows the automobile section removed from the airplane section and the airplane section in its self-sustaining position;

Figure 3 is a vertical section through the cab of the automobile section from the rear, showing certain mechanism associated with the steering wheel;

Figure 4 is a plan view of the steering column and certain immediately associated elements;

Figure 4a is a section on line 4a—4a of Fig. 4;

Figure 5 is a section on the line 5—5 of Figure 4 on an enlarged scale;

Figure 6 is a section on the line 6—6 of Figure 4 on an enlarged scale;

Figure 7 is a section on the line 7—7 of Figure 4 on an enlarged scale;

Figure 8 is a section on the line 8—8 of Figure 4 on an enlarged scale;

Figure 9 is a section on the line 9—9 of Figure 8 on an enlarged scale;

Figure 10 is a section on the line 10—10 of Figure 9 and

Figure 11 is a section corresponding to Figure 10 but with the parts in a different position.

Referring first to Figure 1, the automobile section 1 of the airplane appears at the left of the vehicle and the airplane section 2 appears at the right of the vehicle. In Figure 1 these two sections are combined for flight and in Figure 2 they are separated from each other so that the automobile section may be driven independently as a unit for road travel. When the automobile section is used as a unit the airplane section 2 is left behind.

The airplane section 2 includes lifting wings 3 at its forward portion and at the trailing edges of these wings are the usual ailerons 4. At the rear of the airplane section are the usual control surfaces and these include the rudder 5 and the elevators 6. Beneath these tail surfaces is a landing wheel 7.

When the airplane section is attached to the automobile section as shown in Figure 1, the airplane section is supported as a cantilever as shown in Figure 1. The means for attaching these sections together and by which the sections may be released from each other constitute no part of the present invention and consequently are not shown in detail. A suitable means is disclosed in application Ser. No. 580,844 filed herewith. When this interconnecting means is released and the sections are separated from each other, the airplane section must be self-supporting and to accomplish this it is provided with wheels 8 beneath the forward wings.

Just prior to the time that the airplane section is separated from the automobile section, the wheels 8 and the landing wheel 7 are moved downwardly into contact with the ground. The means by which the wheels 7 and 8 are moved downwardly are not a part of the present invention and therefore are not here described in detail, but suitable means is disclosed in application Ser. No. 580,843, filed herewith. These wheels 7 and 8 support the airplane section in the same position which it would occupy if it were attached to the automobile section so that separation of the sections and their reconnection is facilitated.

The automobile section 1 includes the front wheels 10 and the rear wheels 11. It also includes a motor to which the propeller 13 may be attached for air travel, as shown in Figure 1, or from which it may be removed for road travel, as shown in Figure 2. A steering wheel 14 within the cab portion of the automobile section is provided so that the front wheels 10 may be turned to guide the automobile during road travel or so that the ailerons 4 or elevators 5 of the airplane section may be moved during air travel. The mechanism by which the operation of the steering wheel may be changed from control for road travel to control for air travel, constitutes an important feature of the present invention.

In accordance with the invention, the steering wheel 14 is attached to a square shaft 15 which passes through a hollow member indicated at 16 (Figs. 4 and 5) which as here shown is made up of three united sections. One of these sections is an exteriorly threaded sleeve 17, the second section is a sleeve 18 having internal rollers 19, and the third section is a sprocket sleeve 20 carrying a chain sprocket 21.

The rollers 19 are provided to cause the hollow member 16 to rotate with the rotation of the square shaft 15 and yet permit the square shaft 15 to move endwise back and forth through the hollow member 16. As is best shown in Figure 7, there are four of the rollers 19 and each one of them bears upon one of the four sides of the square shaft 15. Each of the rollers 19 is rotatably mounted upon a bolt 22 passing through the body of the sleeve 18.

Rotation of the square shaft 15 by the hand wheel 14 must therefore carry with it the four rollers 19 and thereby rotate the sleeve 18 and also the threaded sleeve 17 and the sprocket sleeve 20. The threads upon sleeve 17 are for the purpose of driving the mechanism which guides the front wheels 10, as will be explained, and the sprocket 21 on sleeve 20 is for the purpose of driving the mechanism which moves the ailerons, as will also be explained.

To rotatably mount the hollow member 16, a ball bearing 24 is located at one end thereof, and a ball bearing 25 (Fig. 5) is located at the other end thereof. The external raceway of ball bearing 24 is mounted in a cross-member 26 attached at its opposite ends to angle bars 27 and 28; see Figures 4 and 7. These angle bars 27 and 28 are on opposite sides of the square shaft 15 and are parallel thereto. To maintain the spacing of the angle bars 27 and 28 at one of the ends they are connected by a cross-bar 29, and the cross-member 26 serves to maintain their spacing toward their other ends.

The angle bars 27 and 28 are rigidly attached at their opposite ends to any convenient part of the framework of the automobile section. As here shown, their ends adjacent to the cross-bar 29, are attached to a tubing 31 of the framework. The opposite ends of the angle bars 27 and 28 are attached to the inturned edges of plates 32 and 33 on opposite sides of the square shaft 15; see Figure 4a.

The plates 32 and 33 are connected by bolts 34 and 35 respectively to depending lugs 36 and 37 (Fig. 4a) of a tubing 38 which constitutes a rigid part of the automobile framework. Opposite from the bolts 34 and 35, lugs 39 and 40 are attached to the plates 32 and 33 respectively, and a bolt 41 passes through them. By tightening this bolt 41 the plates 32 and 33 may be drawn toward each other for a purpose which will be explained.

The outer raceway of bearing 25 is mounted in a holder 43 (Fig. 5) which is externally threaded and this holder is threaded into a ring 44. There is a circumferential groove around the exterior of ring 44 of a width to receive the plates 32 and 33 and the facing edges of these plates are cut out in arc form to fit into this peripheral groove as appears from Figure 4a. To adjust the bearing 25 axially and take up any endwise movement of the hollow member 16, the holder 43 is screwed deeper into the split ring 44. By then tightening the bolt 41, ring 44 will be clamped about the holder 43 and hold it against rotation. Holder 43 and ring 44 should then be attached together as by welding or by a pin to also prevent rotation of holder 43.

To rotatably mount the end of square shaft 15 opposite from the wheel 14, the square shaft 15 is formed with a reduced cylindrical extension 45 (Fig. 5). A pair of ball bearings 46 are mounted on this extension 45 and held thereon by a nut 47 threaded upon the extension. The outer raceways of these bearings 46 are mounted in a holder 48 having an internal flange 49 which lies between the raceways so that the holder must move endwise with endwise movement of the square shaft 15.

It will be observed that the bearing holder 48, not only must support the end of the square shaft 15 for rotation, but must also permit the endwise movement of the shaft while rotatably supporting it. For this purpose a roller 51 is rotatably mounted between a pair of lugs 52 extending laterally from one side of the holder 48, and another roller 53 is rotatably mounted between a pair of lugs 54 extending laterally from the opposite side of the holder 48; see Figures 4 and 8.

The peripheries of the rollers 51 and 53 are grooved to receive therein an arm of the angle bars 27 and 28. For this purpose, the angle bars 27 and 28 are so disposed that corresponding arms of them face inwardly toward each other and these arms lie in a plane through the center of the square shaft 15, as is evident from Figure 8. These arms of the angle bars 27 and 28 therefore serve as a trackway to guide the end of the square shaft 15 in its endwise movement.

Endwise movement of the square shaft 15 in one direction is limited by the striking of the extension 45 thereof against the cross-bar 29; see Figures 4 and 5. Endwise movement in the other direction is limited by the provision of a lug 56 on a depending post 57 of the holder 48 which strikes against the cross-member 26. As has been explained, during this endwise movement, the square shaft 15 merely moves through the rollers 19 which support it.

This endwise movement of square shaft 15 is permitted so that the elevators 6 will thereby be moved. To accomplish this, a cable 58 and a cable 59 are attached to the depending post 57 of the bearing holder 48, by means of a bolt 60. The bolt 60 is somewhat in advance of the body of the holder 48 as appears from Figure 5 in order to make room for a cable pulley 62.

The cable 58 extends forwardly and passes around the pulley 62 and is connected to one end of a chain 63; see Figure 3. The cable 59 extends rearwardly and passes around a pulley 64 which turns the cable toward the front. The cable 59 then passes around a pulley 65 and is connected to the other end of the chain 63. The pulleys 62, 64 and 65 may be rotatably supported in brackets attached to the framework in any suitable manner and the present structures for accomplishing this are therefore not described in detail.

The chain 63 passes around a sprocket 66 (Figure 3) rotatably mounted upon a pivot attached to the framework and to this sprocket is secured a smaller sprocket 67. A chain 68 passes around sprocket 67 and to its ends are secured the ends of a cable 69. This cable 69 passes over pulleys at 70 and extends rearwardly for connection to the ailerons to move them. The cable 69 is disconnectable from its operating attachment to the ailerons at a suitable point along its length to permit separation of the airplane and automobile sections, but the means for accomplishing this constitutes no part of the present invention. A suitable means for accomplishing this is disclosed in application Serial No. 580,842 issued as U. S. Patent No. 2,430,869 on Nov. 18, 1947.

The sprocket and chain connection at 66, 67 is interposed in the system to obtain a smaller linear movement of cable 69 with respect to the linear movement of cables 58, 59. Because of this the elevators may be moved through their entire range of movement with a relatively long back and forth movement of the wheel 14. The wheel 14 can therefore move back and forth a greater distance than would be required if cable 69 were directly connected to bolt 60 and because of this, finer adjustment of the elevators may be obtained. It will be understood that the advantage afforded by the sprockets 66, 67 may be eliminated by resorting to some other expedient as by merely having a short endwise movement of wheel 14 and directly connecting the cable 69 to bolt 60. It is intended that the cable system which has been described should remain connected at all times as a safety measure and that the only disconnection occur at the zone of separation between the automobile section 1 and the airplane section 2.

During air travel it is essential that the wheel 14 be movable in an endwise direction to operate the elevators, but during road travel it is preferable that the wheel 14 be locked against such endwise movement and the invention provides means for accomplishing this. For this purpose, a notched bar 72 (Figures 5 and 8) is provided and it is movable downwardly to the full line position in Figure 8 in which it engages an upright plate 73 on the bearing holder 48, or it is movable upwardly to the dotted line position in Figure 8 in which it is disengaged from the upright plate 73. As is shown in Figure 5, the bar 72 overlies the full extent of endwise travel of the bearing holder 48, and the notches are closely adjacent to each other so that the upright plate 73 will be engaged at any point to which it may have been moved. To assure entry of a notch in bar 72 over the plate 73, the plate is formed with a tapered upper edge.

To mount the notched bar 72 for movement to or away from the upright plate 73, a connecting plate 74 is attached thereto and to this connecting plate 74 is affixed a rod 75. Rod 75 is rotatably mounted in upright supports 76 and 77 which are attached to the angle bar 28.

While the notched bar 72 may be drawn to its upper disengaging position by any suitable means, as here shown this is under the control of a hand lever 78. This lever 78 is pivoted at 79 to the framework and its upper end is preferably close at hand to the driver; see Figures 1 and 3. It is intended that this lever 78 by suitable other connections thereto, should also bring about other functional changes in the vehicle associated with air travel or with road travel, and these other connections are disclosed in application Ser. No. 580,845 filed herewith.

A draw rod 81 is pivotally connected at 82 to the hand lever 78, and it passes through an opening in an upright lug 83 on the notched bar 72. The free end of the draw rod is headed at 84 so that when it is pulled upon under the action of lever 78, it will draw upon the lug 83 and lift the notched bar 72. When the lever 78 is to the left in Figure 8, it is in the position for road travel and when it is to the right in Figure 8 it is in its position for air travel. As the lever 78 preferably has a range of movement greater than is necessary to lift the notched bar 72, the draw rod 81 is made sufficiently long so that only the last portion of the movement of lever 78 to the right serves to lift the notched bar 72.

It is preferable that the notched bar 72 be spring biased to both its upper and its lower positions and for this purpose the end of the rod 75 beyond the bearing support 76 is bent into the shape of a crank arm as shown at 85; see Figure 5. A spring 86 is connected to 85 and to the angle bar 28, and as is evident from Figure 8, this spring has an over-center relation with respect to the axis of the rod 75 to tend to turn rod 75 either toward the position in which the notched bar 72 will be in its lowered position or its raised position.

As the driver may wish to lift the notched bar 72 without having to manipulate the lever 78, in order to move the wheel 14 to a different endwise position, the rod 75 is extended rearwardly through the dash panel 87 (Figures 4 and 5) and to its end is affixed a handle 88. By turning this handle 88, rod 75 is turned and since the connecting plate 74 is affixed to this rod 75, the notched bar 72 will be lifted. After the wheel 14 is then moved to its desired endwise position, the handle 88 is returned to the position which will cause the notched bar 72 to re-engage the upright plate 73.

It has been stated that the exteriorly threaded sleeve 17 is provided to operate the mechanism which guides the front wheels. This mechanism includes a nut 91 which is threaded upon the sleeve 17. To prevent rotation of nut 91 it is provided with laterally projecting posts 92 (Figure 6) on its opposite sides and rotatably mounted upon the ends of posts 92 are rollers 93. These rollers ride along track plates 94 affixed to the upper surfaces of angle bars 27 and 28. Rotation of the wheel 14 and square shaft 15 therefore causes an axial movement of nut 91.

On the upper and under sides of nut 91 are bosses 95 and upon them are bushings 96 (Fig. 6). Washers 97 fit over the bushings 96 and seat against the body of the nut 91. A pair of levers 98 have slotted openings 99 therein to receive the bushings 96 and they are retained upon these bushings by washers 100 and bolts 101 which are threaded into the bosses 95.

Levers 98 are pivoted by bolts 103 to lugs 104 which are affixed to the framework. The upper lug 104 is attached to a framework tubing 105 (Figures 4 and 6) and the lower lug 104 is attached to a bar 106 also attached to the tubing 105. The bolts 103 are in axial alignment with each other and their axis is parallel to the axis through the bosses 95. Axial movement of the nut 91 therefore causes the lever 98 to swing about the pivot bolts 103 and in order to accommodate the arc the movement of their outer ends, the slots 99 are elongated as appears in Figure 6.

This swinging movement of levers 98 could be utilized to guide the front wheels through a mechanical connection to them, but as here shown the levers 98 are connected to the piston of a fluid pump 107. This pump 107 delivers fluid under high pressure through tubings 108 and 109 to fluid motors in each wheel to guide them. As this fluid pressure system is conventional it is not described here.

The connection from levers 98 to the pump 107 involves a bolt 111 passing through both levers 98 and held in place by an end nut. Upon bolt 111 is a sleeve 112 which is nearly as long as the space between levers 98 and this sleeve may turn on the bolt 111. Affixed to the sleeve 112 centrally of its length is a stud 113 and this stud is adjustably threaded into a clevis 114; see Fig. 4. Clevis 114 is pivoted by a bolt 115 to the piston rod 116 of fluid pump 107.

Fluid pump 107 is attached by a bracket 115 to the angle bar 27. When the wheel 14 is rotated, the levers 98 are therefore oscillated about their pivot bolts 103 and the piston rod 116 is reciprocated within pump 107. The pitch of the threads on sleeve 17 is such that several turns of wheel 14 are required to move nut 91 from one end of the sleeve to the other and give the piston rod 116 its full movement. A central position of the nut 91 is centrally along the piston rod 116 when the nut 91 is centrally along the threaded sleeve 17, is obtained by adjusting the clevis 114 along the stud 113.

It has been stated that the sprocket 21 on sprocket member 20 affords a take-off for driving the ailerons 4. Also, it has been observed that although several complete turns of the wheel 14 are desirable to guide the front wheels 10 from one extreme position to the other extreme position, only about a half turn of the wheel 14 should move the ailerons from one extreme position to the other extreme position. The present invention does not limit the rotation of wheel 14 to the fraction of a turn from a neutral position which will move the ailerons 5 to an extreme position, but permits a continued rotation of the wheel so as to guide the front wheels to their extreme position.

The take-off from sprocket 21 involves a chain 117 which drives a sprocket 118 affixed to a shaft 119. At its forward end the shaft 119 turns in a bearing block 120 (Fig. 6). This bearing block 120 is peripherally grooved to receive a slotted web plate 121 secured within a yoke 122. The bearing block 120 can therefore move along the web plate 121 as a guide in order to make the chain 117 taut and is held in the proper position by an adjusting bolt 123 threaded into the yoke 122. The yoke 122 is attached to the tube 105 and bar 106 of the framework.

Attached to the shaft 119 is a universal joint 124 (Fig. 4) and this universal joint is also attached to a stub shaft 125. Shaft 125 is bearinged in the opposite walls of a rectangularly shaped frame 126 (Figs. 4 and 9). This frame is attached at one end to the framework tubing 127 which is an upright to which the tubing 31 and 105 are connected, and at its other end the frame 126 is attached to the angle bar 27.

Secured onto shaft 125 is a pinion gear 128 which meshes with a larger gear 129 (Figs. 4, 8 and 9). Gear 129 fits onto the outer race of a needle bearing 131 and this bearing turns upon a bolt 132 which passes through the walls of frame 126. Spacer collars 133 serve to maintain the needle bearing 131 centrally along the bolt 132.

Attached to the gear 129 by bolts 134 are outer discs 135 constituting a part of a modified Geneva connection. Between discs 135 is a cut-away smaller disc 136. Spacers 137 on opposite sides of the cut-away disc 136 and upon the bolts 134, space the outer discs 135 slightly away from the cut-away disc 136.

Extending between the outer discs 135 and secured to them, is a bolt 138 which carries a roller 139 between these plates. As appears from Fig. 10, this bolt 138 is in horizontal alignment with the bearing bolt 132, when the parts are in the neutral position of this figure. Also from this figure it will appear that the cut-away part of disc 136 is symmetrical with respect to the bolt 138.

The bolt 138 and its roller 139 are utilized to drive a two-armed lever 141. To an upper arm of this lever 141 is connected a cable 142 and to its lower arm is connected a cable 143. Cables 142 and 143 pass over rollers 144 and 145 respectively (Fig. 3) and over rollers at 70 for driving connection to the ailerons 4.

Midway of the lever 141, between the attachment thereto of cables 142 and 143, the lever receives a needle bearing 144 which turns on a bolt 145. Bolt 145 is secured within the frame 126 and spacer sleeves 146 thereon hold the needle bearing in a position along the bolt 145 which will align the lever 141 with the cut-away disc 136.

Projecting from the lever 141 in a direction toward the bearing bolt 132, are extensions 147 forming between them a slot 148. This slot 148 is open toward the bolt 132 and when the parts are in the neutral position of Fig. 10 the slot 148 is in line with a line joining the bolts 132 and 145. This slot 148 receives the roller 139.

From the neutral position of Fig. 10, rotation of discs 135 in either direction will carry with them the roller 139 and this will cause the lever 141 to turn and pull upon one or the other of cables 142, 143. In Fig. 11 the parts have been turned to the extent which will have moved the lever 141 to its extreme position in one direction. A positive driving connection has been established between roller 139 and the walls of slot 148 up to this point.

Continued rotation of discs 135 in the direction of the arrow of Fig. 11 will move the roller 139 out of the open end of this slot, as is evident from this figure. The discs 135 can then be continued to be turned in the direction of the arrow in Fig. 11 as this will merely move the roller 139 in an arc further away from the slot 138, and the roller 139 is free in this movement. During this continued movement of the roller 139 away from the slot 138, the lever 141 will be left in its turned position of Fig. 11.

The discs 135 cannot, however, be turned so far in the direction of the arrow in Fig. 11, as to bring the roller into contact with the upper side of the extension 147 of lever 141, as before this time the nut 91 will have reached the end of its travel along the threaded sleeve 17 and continued rotation of wheel 14 will be prevented. While this endwise movement of nut 91 may be limited by the bearing holder 43 at one end and by the roller sleeve 18 at the other end (Fig. 5), in order to prevent binding of the threads, other means are here provided. This includes a pin 150 (Fig. 4) on the roller sleeve 18 which will strike against a pin 151 on nut 19, as they approach each other, and a pin 152 on bearing holder 43 which will strike against a pin 153 on nut 19 as they approach each other in the opposite direction. These pins positively stop rotation of the square shaft 15 without causing any binding on the threads.

After the roller 139 has moved out of the slot 148 by continued rotation of discs 135 from the position of Fig. 11, it is important that the lever 141 be held in the position at which the roller 139 left the slot 148 so that upon reversed rotation of discs 135 the roller 139 will reenter slot 148. It is for this purpose that the cut-away disc 136 is provided as its outer circular surface cooperates with the outer surfaces 154 of extensions 147 in the manner shown in Fig. 11. These surfaces 154 are of arc shape having as their centers the axis of cut-away disc 136 when the lever 141 is in its extreme positions, and the radius of arc surfaces 154 is the same as the radius of the cut-away disc 136.

This contact between the periphery of cut-away disc 136, and one of the surfaces 154, after the lever 141 has been moved to an extreme position, serves to lock the lever 141 in that position. This does not, however, prevent further rotation of discs 135 as the cut-away disc 136 merely rotates within the surface 154 because of their identical circular shapes. The disc 136 is cut-away to receive the extensions 147 when the parts are in or close to the neutral position of Fig. 10.

The cables 142 and 143 may be disengaged from their driving connection to the ailerons 5, at the zone of separation between the automobile section 1 and the airplane section 2, in the same manner that the cable 69 is disengaged. As this disengagement is not a part of the present invention it is not described. It will be appreciated that except for such a disengagement of the cables at the zone of separation of the automobile and airplane sections, the mechanism of this invention remains intact and this is an important safety feature of the invention.

The mechanism operates easily and smoothly throughout its manipulation. Thus, while the hollow member 16 is in effect splined to the wheel shaft 15, the provision of a square shaft 15 and rollers 19 makes it easy to move this shaft endwise although a strong turning force is being exerted on the wheel 14 to move the ailerons. In like manner, operation of the steering mechanism is made more easily possible as the provision of two levers 98 balances the loads and prevents binding of nut 91 on threaded sleeve 17.

What is claimed is:

1. In a roadable airplane including an automobile section which may be removed from an airplane section, said automobile section comprising a power unit and wheels for road travel including guidable front wheels, and said airplane section comprising lifting wings and movable control surfaces including ailerons and elevators, the combination in said automobile section of a steering wheel, a shaft connected to said steering wheel to be rotated thereby, bearing means mounting said shaft for rotary movement and for endwise movement, a connection to said shaft for moving the elevators upon endwise movement of the shaft, a rotatably mounted member having a driving engagement with said shaft for rotation thereby but being free of endwise movement by the shaft, a power take-off means on said member for operative connection to the front wheels to guide them upon rotation of said shaft, another power take-off means on said member for moving the ailerons, and a connection from said last named means to said ailerons, said last named connection including a Geneva-type mechanism permitting continued rotation of the member in the same direction after the ailerons have been moved to an extreme position to thereby enable the front wheels to be guided to an extreme position.

2. In a roadable airplane including an automobile section which may be removed from an airplane section, said automobile section comprising a power unit and wheels for road travel including guidable front wheels, and said airplane section comprising lifting wings and movable control surfaces including ailerons and elevators, the combination in said automobile section of a steering wheel, a shaft connected to said steering wheel to be rotated thereby, bearing means mounting said shaft for rotary movement and for endwise movement, a connection to said shaft for moving the elevators upon endwise movement of the shaft, a rotatably mounted member having a driving engagement with said shaft for rotation thereby but being free of endwise movement by the shaft, a power take-off means on said member for operative connection to the front wheels to guide them upon rotation of said shaft, another power take-off means on said member for moving the ailerons, and a connection from said last named means to said ailerons, said last named connection including a mechanism permitting continued rotation of the member in the same direction after the ailerons have been moved to an extreme position to thereby enable the front wheels to be guided to an extreme position, said mechanism including an arcuately movable pin and a lever having an open slot receiving said pin, the aileron connections being established to said lever.

3. In an automobile section which may be connected to an airplane section having lifting and control surfaces to form an airplane, the combination of a steering wheel, a shaft connected to said steering wheel, means mounting said shaft for rotational and endwise movement, a connection to said shaft for moving the elevators upon endwise movement of the shaft, a rotatably mounted member having a driving engagement with said shaft for rotation thereby but being free of endwise movement by the shaft, a power take-off means on said member for operative connection to the front wheels to guide them upon rotation of said shaft, another power take-off means on said member for moving the ailerons, and a connection from said last named means to said ailerons, said last named connection including a mechanism permitting continued rotation of the member in the same direction after the ailerons have been moved to an extreme position to thereby enable the front wheels to be guided to an extreme position, said mechanism including an arcuately movable pin and a lever having an open slot receiving said pin, the aileron connections being established to said lever.

4. In an automobile section which may be connected to an airplane section having lifting and control surfaces to form an airplane, the combination of a steering wheel, a shaft connected to said steering wheel, means mounting said shaft for rotational and endwise movement, a connection to said shaft for moving the elevators upon endwise movement of the shaft, a rotatably mounted member having a driving engagement with said shaft for rotation thereby but being free of endwise movement by the shaft, a power take-off means on said member for operative connection to the front wheels to guide them upon rotation of said shaft, another power take-off means on said member for moving the ailerons, and a connection from said last named means to said ailerons, said last named connection including a mechanism permitting continued rotation of the member in the same direction after the ailerons have been moved to an extreme position to thereby enable the front wheels to be guided to an extreme position said mechanism including an arcuately movable pin and a lever having an open slot receiving said pin, and also including means to retain the lever in the extreme position to which it is moved by said pin after the pin has left said open slot, the aileron connections being established to said lever.

5. In a roadable airplane including an automobile section which may be removed from an airplane section, said automobile section comprising a power unit and wheels for road travel including guidable front wheels, and said airplane section comprising lifting wings and movable control surfaces including ailerons and elevators, the combination in said automobile section of a rotatably mounted steering wheel, means driven by rotation of said steering wheel for operative connection to the front wheels to guide them, and other means driven by rotation of said steering wheel for operative connection to said ailerons to move them, said other means including a Geneva-type mechanism permitting continued rotation of the steering wheel in the same direction after the ailerons have been moved to an extreme position to thereby enable the front wheels to be guided to an extreme position.

6. In a roadable airplane as defined in claim 1 the further improvement that comprises the inclusion of a reduction gearing in the connection for moving the ailerons.

ROBERT E. FULTON, JR.
OCTAVIO JOSE ALVAREZ.

REFERENCES CITED

The following references are of record in the file of this patent:

UNITED STATES PATENTS

| Number | Name | Date |
| --- | --- | --- |
| 2,156,288 | Holliday | May 2, 1939 |
| 2,340,237 | Upson | Jan. 25, 1944 |
| 2,355,026 | Koppen | Aug. 1, 1944 |
| 2,417,725 | Zuck | Mar. 18, 1947 |